*US012075074B2*

United States Patent
Morogan et al.

(10) Patent No.: US 12,075,074 B2
(45) Date of Patent: Aug. 27, 2024

(54) SYSTEMS AND METHODS FOR MULTI-CORE IMAGE ENCODING

(71) Applicant: Apple Inc., Cupertino, CA (US)

(72) Inventors: Liviu R Morogan, San Jose, CA (US); Athanasios Leontaris, Cupertino, CA (US); Mark P Rygh, Union City, CA (US); Sorin C Cismas, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/675,414

(22) Filed: Feb. 18, 2022

(65) Prior Publication Data

US 2023/0102584 A1    Mar. 30, 2023

Related U.S. Application Data

(60) Provisional application No. 63/248,253, filed on Sep. 24, 2021.

(51) Int. Cl.
*H04N 19/436* (2014.01)
*H04N 19/127* (2014.01)
*H04N 19/157* (2014.01)
*H04N 19/169* (2014.01)
*H04N 19/172* (2014.01)
*H04N 19/186* (2014.01)
*H04N 19/40* (2014.01)
*H04N 19/423* (2014.01)

(52) U.S. Cl.
CPC ......... *H04N 19/436* (2014.11); *H04N 19/127* (2014.11); *H04N 19/157* (2014.11); *H04N 19/172* (2014.11); *H04N 19/186* (2014.11); *H04N 19/1883* (2014.11); *H04N 19/40* (2014.11); *H04N 19/423* (2014.11)

(58) Field of Classification Search
CPC .. H04N 19/436; H04N 19/127; H04N 19/157; H04N 19/172; H04N 19/186; H04N 19/1883; H04N 19/40; H04N 19/423
See application file for complete search history.

(56) References Cited

U.S. PATENT DOCUMENTS

| | | | |
|---|---|---|---|
| 9,106,888 | B2 | 8/2015 | Chou |
| 9,148,669 | B2 | 9/2015 | Huang et al. |
| 9,215,472 | B2 | 12/2015 | Orr et al. |
| 9,218,639 | B2 | 12/2015 | Cote et al. |
| 9,224,186 | B2 | 12/2015 | Rygh et al. |
| 9,224,187 | B2 | 12/2015 | Cote et al. |
| 9,270,999 | B2 | 2/2016 | Cote et al. |
| 9,292,899 | B2 | 3/2016 | Schaub et al. |

(Continued)

OTHER PUBLICATIONS

International Search Report & Written Opinion for PCT Application No. PCT/US2022/035349 dated Oct. 14, 2022; 10 pgs.

*Primary Examiner* — Mohammed S Rahaman
(74) *Attorney, Agent, or Firm* — Fletcher Yoder, P.C.

(57) ABSTRACT

The present disclosure relates to systems and methods of multi-processing core processing of image frames during image encoding. The multiple processing cores may be connected via dedicated interfaces and transfer neighbor data between the processing cores to enable parallel processing of frame data. The multiple processing cores may each process quad-rows of image data for a single frame in parallel to reduce memory usage and mitigate latency in video encoding.

20 Claims, 11 Drawing Sheets

(56) References Cited

U.S. PATENT DOCUMENTS

| | | | |
|---|---|---|---|
| 9,299,122 | B2 | 3/2016 | Okruhlica et al. |
| 9,305,325 | B2 | 4/2016 | Cheng et al. |
| 9,336,558 | B2 | 5/2016 | Cote et al. |
| 9,351,003 | B2 | 5/2016 | Cote et al. |
| 9,380,312 | B2 | 6/2016 | Cote et al. |
| 10,115,223 | B2 | 10/2018 | Tanner et al. |
| 10,963,263 | B2 | 3/2021 | Shifer et al. |
| 2006/0070054 | A1* | 3/2006 | Naik ............... G06F 8/656 717/165 |
| 2008/0316365 | A1* | 12/2008 | Choi ............... H04N 19/51 348/E5.062 |
| 2010/0296575 | A1* | 11/2010 | Lee ............... H04N 19/137 375/E7.026 |
| 2011/0078222 | A1* | 3/2011 | Wegener ............ H03M 7/30 708/203 |
| 2013/0136188 | A1 | 5/2013 | Kumar et al. |
| 2015/0092833 | A1 | 4/2015 | Ku et al. |
| 2015/0092843 | A1 | 4/2015 | Millet et al. |
| 2015/0092855 | A1 | 4/2015 | Chou et al. |
| 2016/0007038 | A1 | 1/2016 | Chou et al. |
| 2016/0021385 | A1 | 1/2016 | Chou et al. |
| 2016/0054969 | A1 | 2/2016 | Maruyama |
| 2016/0065969 | A1* | 3/2016 | Cheng ............... G06F 9/461 375/240.24 |
| 2017/0034522 | A1* | 2/2017 | Yang ............... G06F 9/5011 |
| 2018/0322606 | A1 | 11/2018 | Das et al. |
| 2021/0185333 | A1 | 6/2021 | Schmit et al. |

\* cited by examiner

SYSTEMS AND METHODS FOR MULTI-CORE IMAGE ENCODING

CROSS-REFERENCE TO RELATED APPLICATIONS

This application claims priority to U.S. Provisional Application No. 63/248,253, entitled, "Systems and Methods for Multi-Core Image Encoding," filed Sep. 24, 2021, the disclosure of which is incorporated by reference in its entirety for all purposes.

SUMMARY

This disclosure relates to systems and methods of image encoding using multiple processing cores and, more particularly, using multiple processing cores to encode the same image frame in parallel.

A summary of certain embodiments disclosed herein is set forth below. It should be understood that these aspects are presented to provide the reader with a brief summary of these certain embodiments and that these aspects are not intended to limit the scope of this disclosure.

Numerous electronic devices—such as cellular devices, televisions, handheld devices, and notebook computers—often display images and videos on an electronic display. To efficiently send and receive image data, many electronic devices include video encoding circuitry that encodes video and image data. As images and videos gain increasing resolution and dynamic range, the amount of data involved in encoding has grown, which places an increasing burden on the video encoding circuitry.

SUMMARY

A summary of certain embodiments disclosed herein is set forth below. It should be understood that these aspects are presented to provide the reader with a brief summary of these certain embodiments and that these aspects are not intended to limit the scope of this disclosure.

Video data encoding using multiple processing cores may reduce data storage capabilities used during encoding and increase efficiency of video stream encoding. The multiple processing cores may encode video data in parallel by communicating across dedicated interfaces between the processing cores. This may enable a processing core to begin encoding frame data and send data to another processing core to enable the other processing core to continue coding further frame data. This reduces the amount of storage used for image encoding by introducing multiple processing cores that can communicate data between the processing cores.

Thus, embodiments herein provide various apparatuses and techniques to reduce latency and reduce memory involved in encoding of image frames. To do so, embodiments disclosed herein use multiple processing cores to enable multi-processing core encoding operations. The multi-processing core encoding operations enable two or more processing cores to operate in an interconnected mode where the processing cores may be connected through a dedicated interface that enables communication of neighbor data between the processing cores. The dedicated interface may enable the processing cores to encode the same image frame in parallel. This enables the speed of processing for a single video stream to increase, thus reducing latency in image encoding. The ability to use multiple processing cores also reduces memory involved in processing quad-rows of image frames, due to the processing cores' ability to transfer neighbor pixel data between the processing cores. Additionally, the processing cores may function independently of each other to enable encoding of multiple video streams in parallel using the multiple processing cores.

BRIEF DESCRIPTION OF THE DRAWINGS

Various aspects of this disclosure may be better understood upon reading the following detailed description and upon reference to the drawings described below.

DETAILED DESCRIPTION

Figure 1:
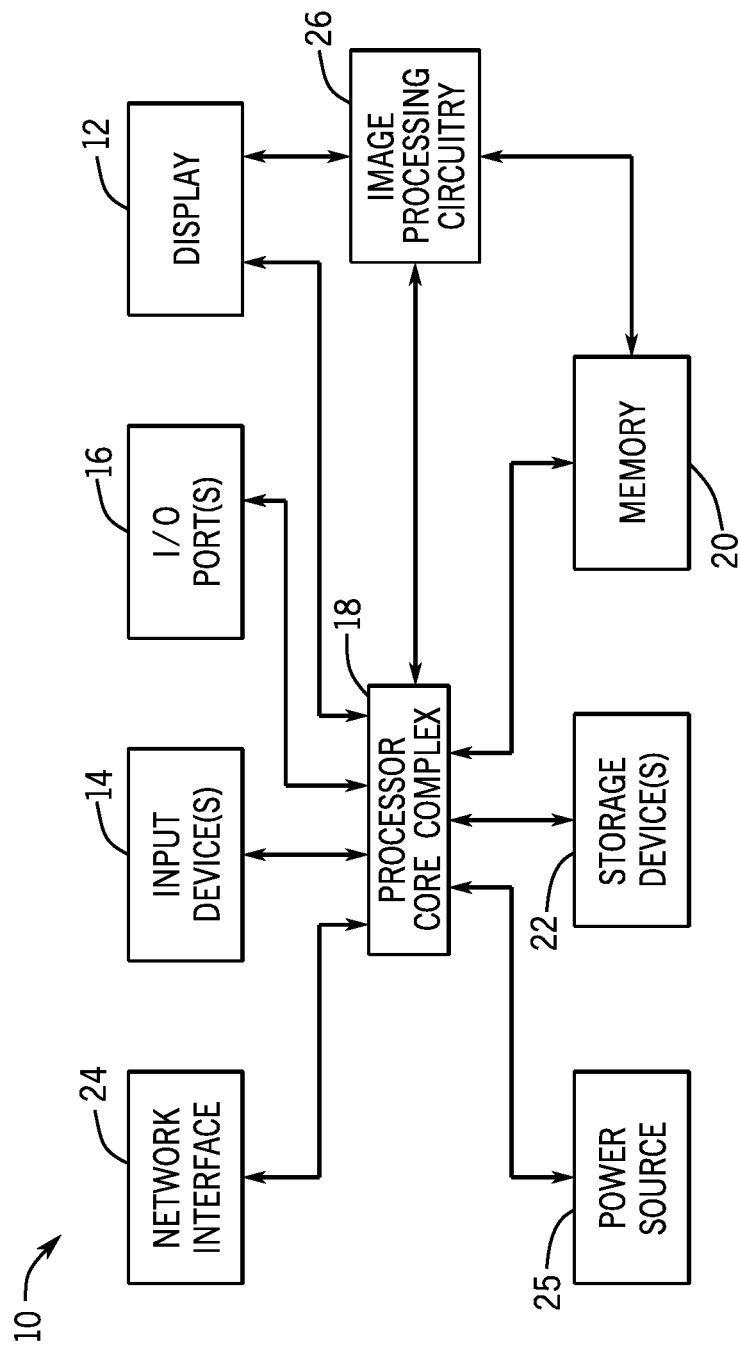
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to multiple processing core encoding of image frames in parallel. In traditional video stream encoding methods a single processing core may be used to encode each image frame of the video stream. The processing core may encode images according to a High Efficiency Video Encoding (HEVC) compression scheme, Advanced Video Coding Compression scheme, or any other suitable compression scheme. The processing core may process quad-rows (e.g., image frame strips of 64 pixel high) of image frame data to encode frames of image data individually. This may result in latency in video stream encoding due to every frame having to be encoded before the next frame may be encoded by the processing core, and the use of a large amount of memory to contain the image frame data of a completed quad-row to use for processing of the next quad-row of the image frame by the processing core.

Embodiments herein provide various apparatuses and techniques to reduce latency and reduce memory involved in encoding of image frames. To do so, embodiments disclosed herein use multiple processing cores to enable multi-processing core encoding operations. The multi-processing core encoding operations enable two or more processing cores to operate in an interconnected mode where the processing cores may be connected through a dedicated interface that enables communication of neighbor data between the processing cores. The dedicated interface may enable the processing cores to encode the same image frame in parallel. This enables the speed of processing for a single video stream to increase, thus reducing latency in image encoding. The ability to use multiple processing cores also reduces memory storage involved in processing quad-rows of image frames due to the processing cores ability to transfer neighbor pixel data between the processing cores. Additionally, the processing cores may function independently of each other to enable encoding of multiple video streams in parallel using the multiple processing cores.

With this in mind, an example of an electronic device 10, which includes an electronic display 12 that may benefit from these features, is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor processing core complex 18 having one or more processors or processor processing cores and/or image processing circuitry, memory 20, one or more storage devices 22, a network interface 24, and a power supply 25. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor processing core complex 18 may be disposed as a separate module or may be disposed within the electronic display 12.

The processor processing core complex 18 is coupled with the memory 20 and the storage device 22. As such, the processor processing core complex 18 may execute instructions stored in memory 20 and/or a storage device 22 to perform operations, such as generating or processing image data. The processor processing core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor processing core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., image data) to a communication network and/or receive data from the communication network.

The power supply 25 may provide electrical power to operate the processor processing core complex 18 and/or other components in the electronic device 10, for example, via one or more power supply rails. Thus, the power supply 25 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for an RGB pixel arrangement).

The electronic display 12 may display an image by controlling the luminance of its display pixels based at least in part image data associated with corresponding image pixels in image data. In some embodiments, the image data may be generated by an image source, such as the processor processing core complex 18, a graphics processing unit (GPU), an image sensor, and/or memory 20 or storage 22. Additionally, in some embodiments, image data may be received from another electronic device 10, for example, via the network interface 24 and/or an I/O port 16.

Figure 2:
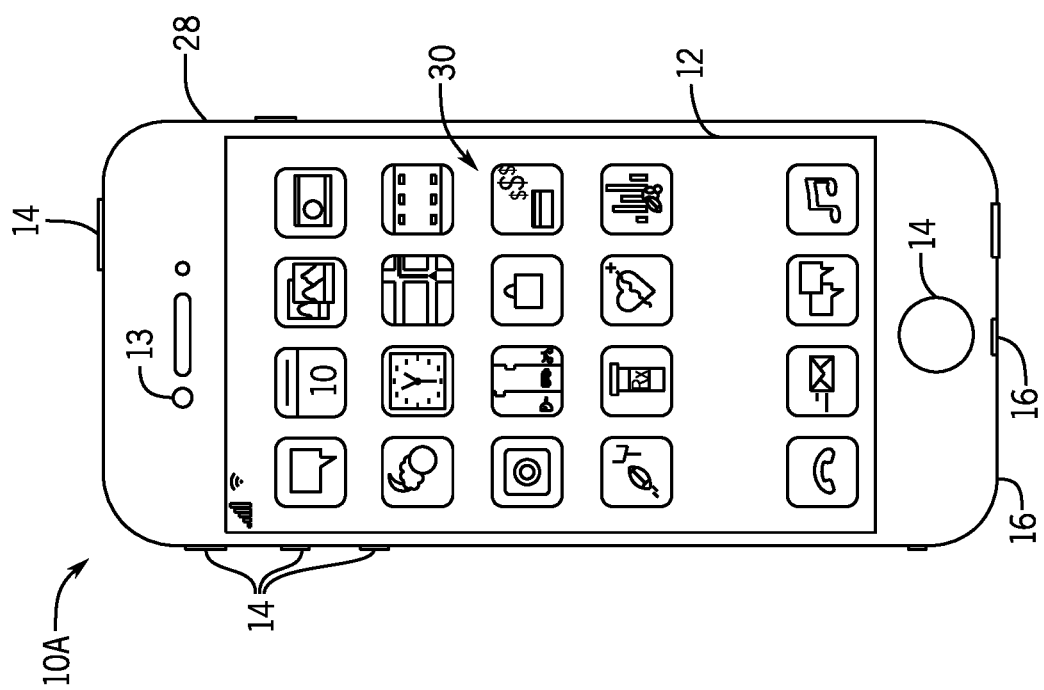
FIG. 2 is a front view of a mobile phone representing an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons. By way of example, when an icon is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
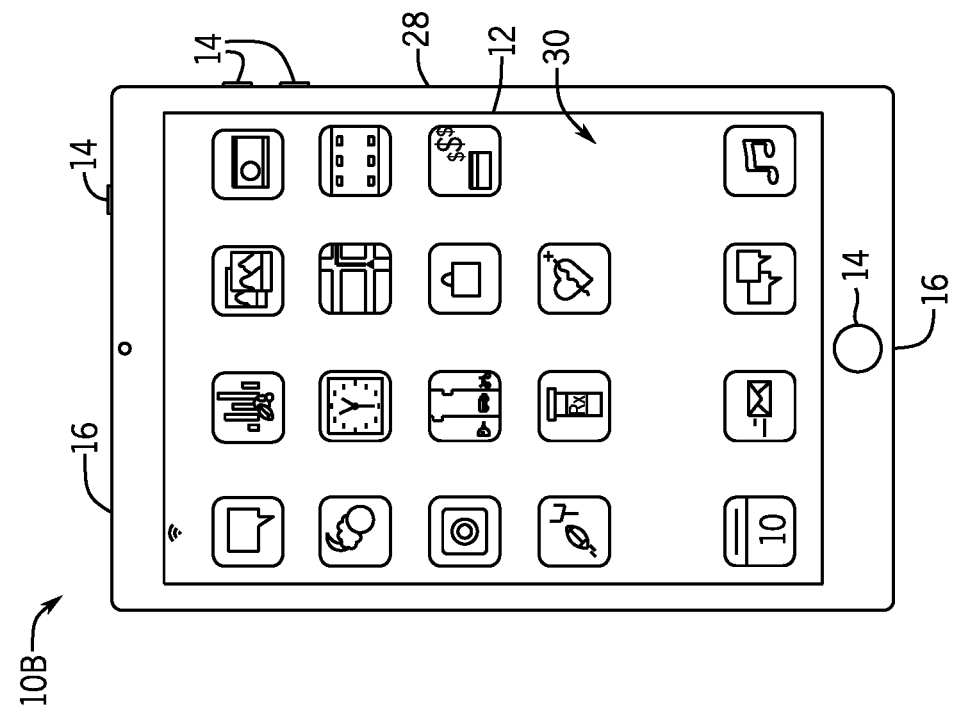
FIG. 3 is a front view of a tablet device representing an example of the electronic device of FIG. 1, in accordance with an embodiment.
Figure 4:
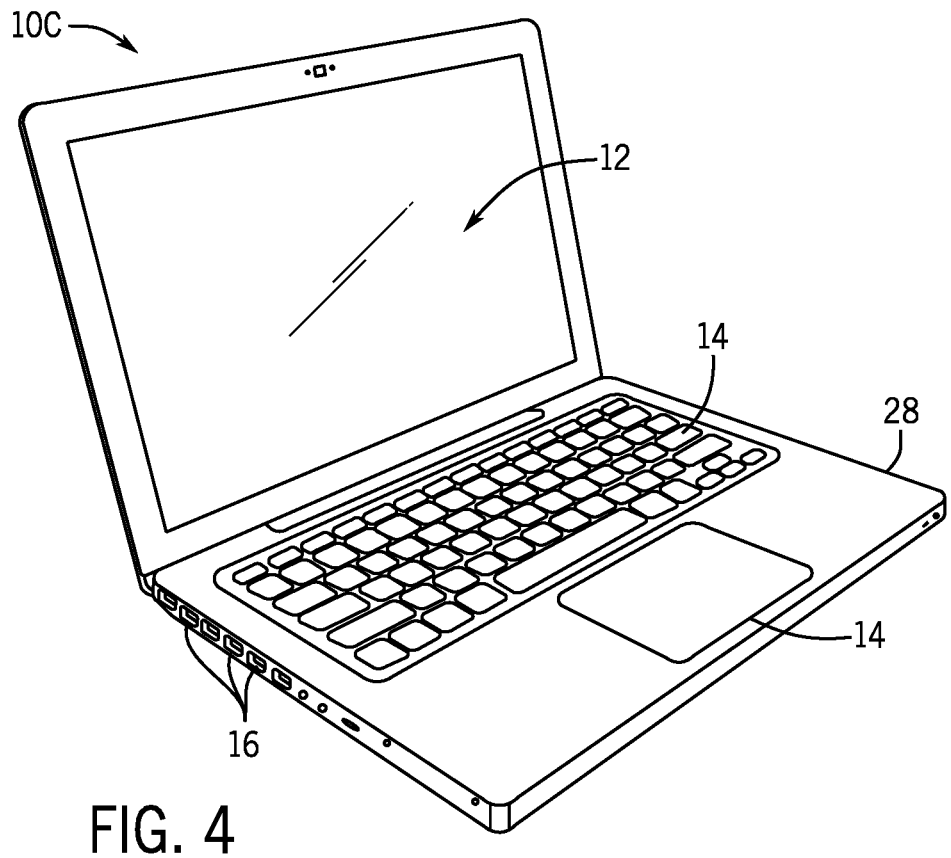
FIG. 4 is a front view of a notebook computer representing an example of the electronic device of FIG. 1, in accordance with an embodiment.
Figure 5:
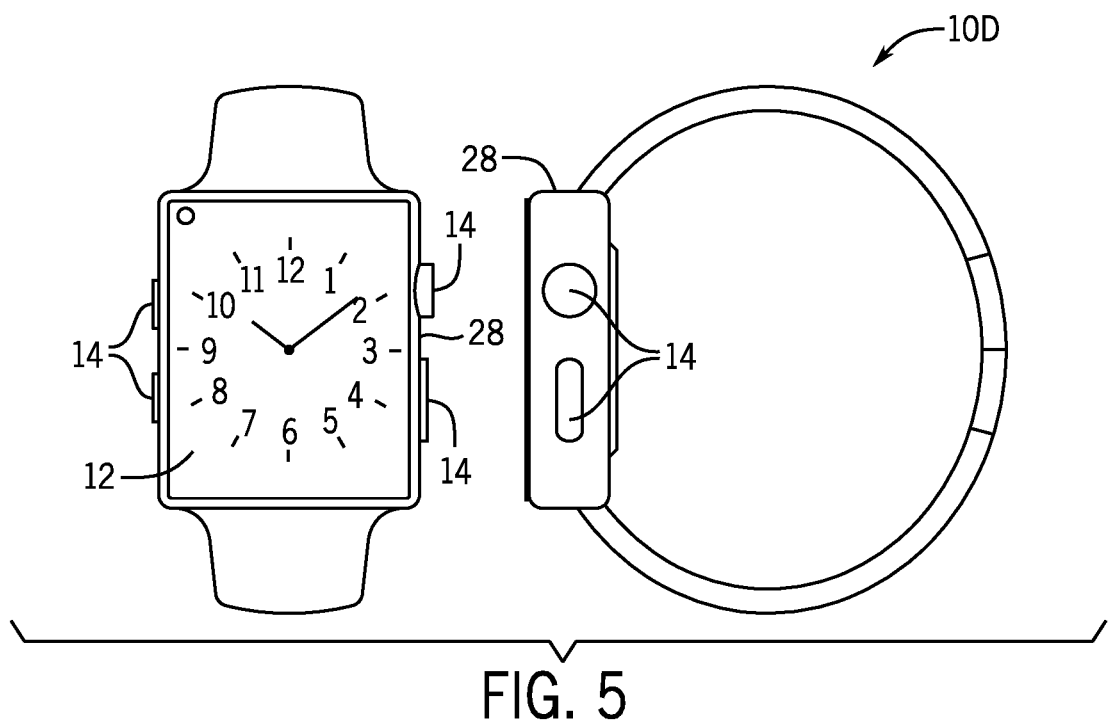
FIG. 5 are front and side views of a watch representing an example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

As discussed above, the video data may include data encoded using multiple compression schemes (e.g., HEVC, AVC, VP9, and the like). The encoder hardware may include multiple pipelines that correspond to each compression scheme to enable data to be encoded according to the desired compression scheme for the video data.

Figure 6:
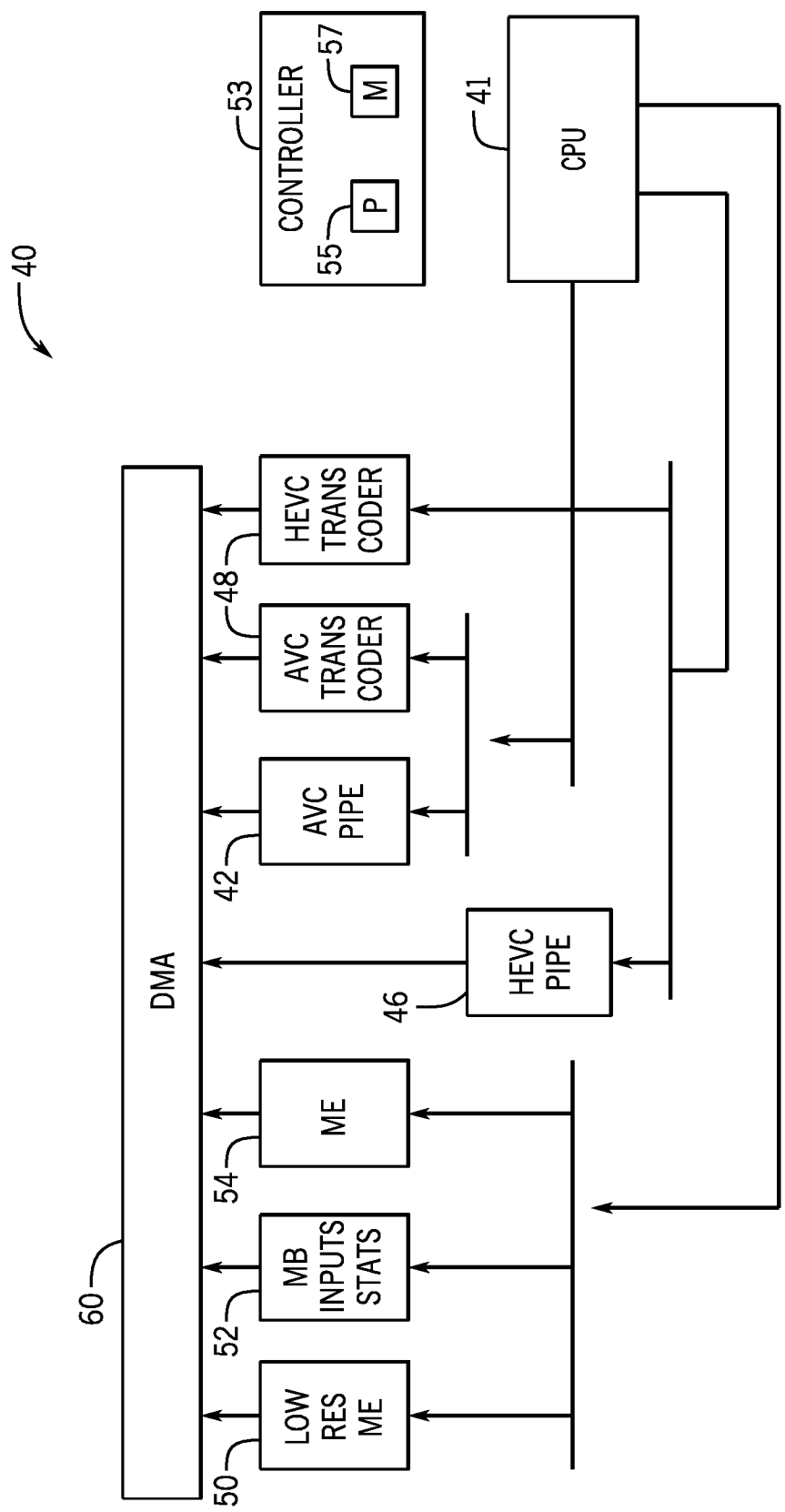
FIG. 6 is a block diagram of a video encoder, in accordance with an embodiment.

With the foregoing in mind FIG. 6 is a block diagram of a video encoder 40, in accordance with an embodiment. The video encoder components may include an Advanced Video Coding (AVC) (e.g., H.264) encoder pipeline 42 and associated transcoder 48 and a High Efficiency Video Coding (HEVC) (e.g., H.265) 46 encoder pipeline and associated transcoder 48 to enable encoding of video frames according to the compression scheme used to encode the frames.

The video encoder 40 components may couple to a central processing unit (CPU) 41 which may generate or be coupled to video stream data outputs and control inputs. The video stream data may be merged and sent to the HEVC and AVC encoder hardware. The video stream data may also be routed to a Low-Res ME (Motion Estimation) block 50 which collects image statistics data for an image frame of the video stream, and enables creation of a histogram of scaled luma pixels, a Macroblock (MB) Input Statistics block 52 that enables collection of statistics for different block sizes and enables variance histograms of gradients to be created from the video stream data. The MB input stats 52 output may be coupled to a Motion Estimation block 54. The output of the statistical image data generated by the Motion Estimation block 54 may be transferred to a direct access memory (DMA) 60 for storage, and may then be directed from the DMA 60 for further processing. Multiple video encoder components may be introduced according to video stream compression specifications.

Additionally, the video encoder 40 may include a controller 53 that may control operations of the video encoder 40, including access to a memory of the video encoder 40. The controller 53 may include a controller processor 55 and controller memory 57 to control the video encoder 40. The controller processor 55 may execute instructions stored in the controller memory 57. The controller processor 55 may be included in the processor processing core complex 18, the image processing circuitry 26, a timing controller in the display 12, a separate processing module, or any combination thereof. The electronic device 10 may include the controller memory 57, at least in part, in the local memory, the memory storage devices, a separate tangible, non-transitory, computer readable medium, or any combination thereof.

As discussed above, video stream encoding using a single processing core may result in latency in image frame processing and may involve large amounts of memory to store data corresponding to each quad-row that is currently processed. To mitigate these issues, multiple processing cores may be implemented to encode each image frame of video streams in parallel.

Figure 7:
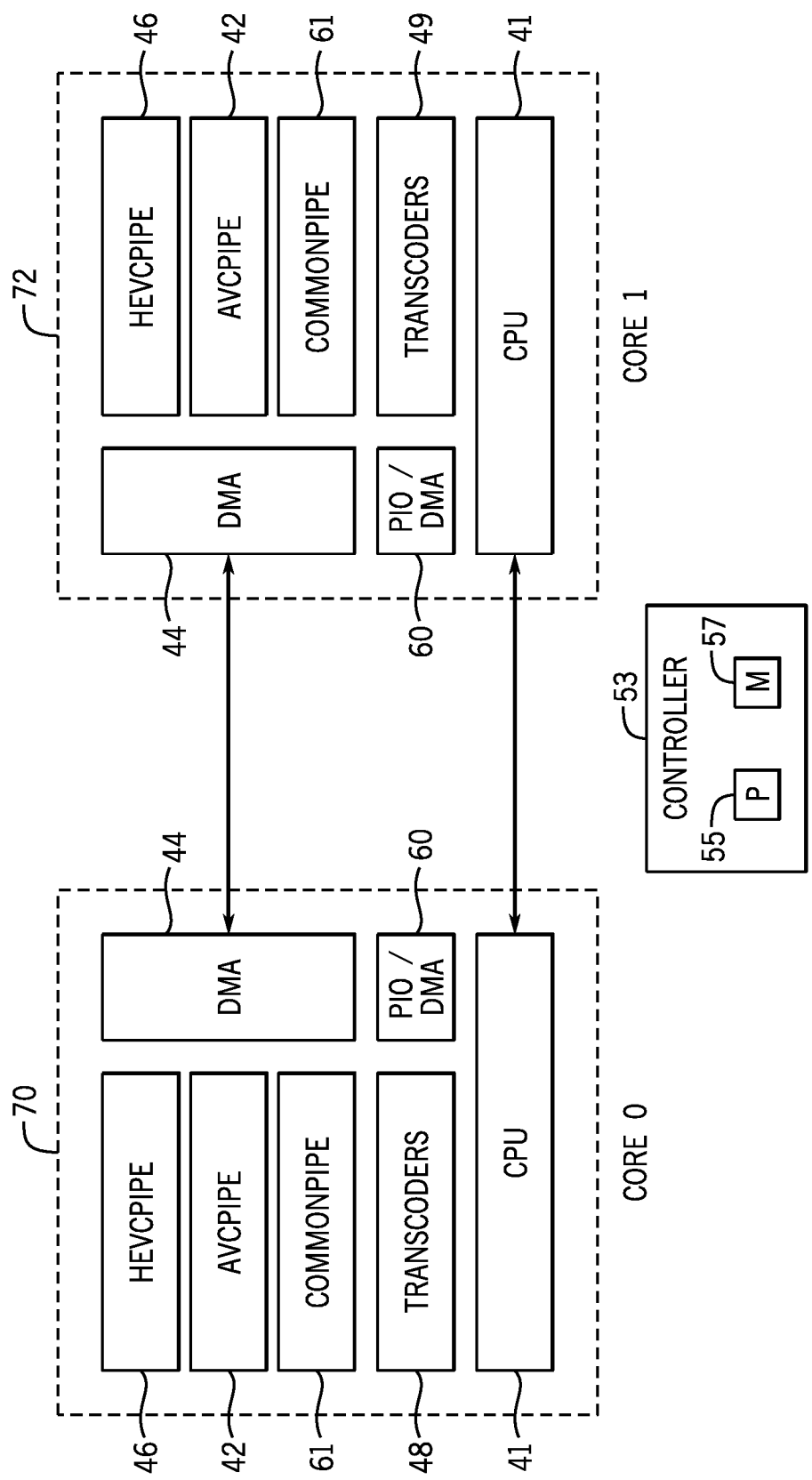
FIG. 7 is block diagram of two interconnected processing cores, in accordance with an embodiment.

With the foregoing in mind, FIG. 7 is a diagram of two processing cores processing for video encoding, in accordance with embodiments of the present disclosure. The video encoder 40 may include multiple processing cores that may function to encode the same image frame in parallel.

For example, a video encoder may include a first processing core 70 (e.g., processing core 0) and a second processing core 72 (e.g., processing core 1). The two processing cores 70, 72 may include multiple hardware encoder elements including the HEVC pipe 46, the AVC pipe 42 (e.g., H.264 pipe), a common pipe 61 multiple transcoders 48, 49, programmed input/output (PIO) DMA 60, and the DMA 44. The processing cores may be able to communicate with each other through a dedicated interface that connects the CPU 41 and the DMA 44 of each respective processing core to transfer quad-row neighbor data during the encoding process. The dedicated interface may include wires connecting the processing core 0 70 to the processing core 1 72 and/or may use memory buffer components to connect the processing cores without using the direct interface connections. The connection between the processing core 0 70 and the processing core 1 72 may enable communication of quad-row neighbor data during encoding of a single image frame of a video stream.

Additionally, the processing core 0 70 and the processing core 1 72 may be programmed to encode the same image frame concurrently. The two processing cores 70, 72 encoding ability does not specify independent and/or dependent slices of image data, and the two processing cores 70, 72 may maintain operation of the loop filters during encoding. This may mitigate the production of artifacts across boundaries of frame sections that may result from frame segments encoded by separate processing cores.

For example, the processing core 0 70 and the processing core 1 72 may be used to encode a single bitstream at a faster rate than a single processing core used for bitstream encoding. As described above, the processing core 0 70 and the processing core 1 72 may be used in an interconnected mode. The processing cores, 70, 72 in the interconnected mode, may receive image frame data divided into quad-rows (e.g., 64-luma strips of two 32×32 Coding Tree Unit (CTU) rows for HEVC compression format or four 16×16 Macroblock rows for AVC compression format). The processing cores 70, 72 may each function to encode alternate quad-rows of image frame data. The processing cores 70, 72 may be interlocked to enable the function of the two processing cores to be similar to a single large processing core. For example, the processing cores 70, 72 may maintain coding dependencies by exchanging information between the processing cores 70, 72 as described above.

The CPU of the processing core 0 70 and the CPU of the processing core 1 72 may communicate using an interface to coordinate encoding of the context of the image frame. The DMA engines 44 of the processing core 0 70 and the processing core 1 72 may also communicate. The communication between the DMA engines 44 may involve the exchange of encoding information and flow control communications to facilitate support of the inter-processing core channels. In some embodiments, the controller 53 of the video encoder 40 may control operation of the communication between the CPU of the processing core 0 70 and the CPU of the processing core 1 72. The controller processor 55 may execute instructions stored in the controller memory 57, the instructions may relate to the transfer of data from CPU of the processing core 0 70 and the CPU of the processing core 1 72. The controller processor 55 may execute software and/or firmware that may instruct the CPU of the processing core 0 70 and the CPU of the processing core 1 72 how to route the data between the processing cores and/or direct the data to be routed from the processing core 0 70 to the processing core 1 72 by controlling the routing path between the processing cores, detailing how to route the data between the processing cores, and encoding order corresponding to the routed image data.

Additionally, the controller 53 of the video encoder 40 may send instructions to the processing cores 70, 72 to direct encoding of video data using the data routed between the processing cores 70, 72. The controller 53 may send instructions to either processing core to direct the video encoder hardware 40 to utilize the neighbor data passed between the cores during the encoding of the video data.

The HEVC pipe 46 and the AVC pipe 42 may be able to exchange information across the processing cores via the methods and interfaces mentioned above. For example, the HEVC pipe 46 and the AVC pipe 42 may exchange image encoding data of similar quad-rows to enable encoding of the next quad-row by the processing core 1 72 before coding of the present quad-row is finished by the processing core 0 70 that is in communication with the processing core 1 72. The neighbor pixel data and other coding mode information (e.g., motion vectors) may also be used across quad-rows for luma and chroma prediction, as well as deblocking and filtering in the HEVC compression video mode. This image frame data may be communicated from one processing core to the other by using the DMA engines 44 of the processing cores. The transcoders 48 may not communicate between the processing cores, to enable each frame to be transcoded for the transcoder corresponding to each processing core. The communication between the processing cores may be cross directional and may occur with the processing core 0 70 sending data to the processing core 1 72 and/or the processing core 1 72 sending data to the processing core 0 70.

Figure 8:
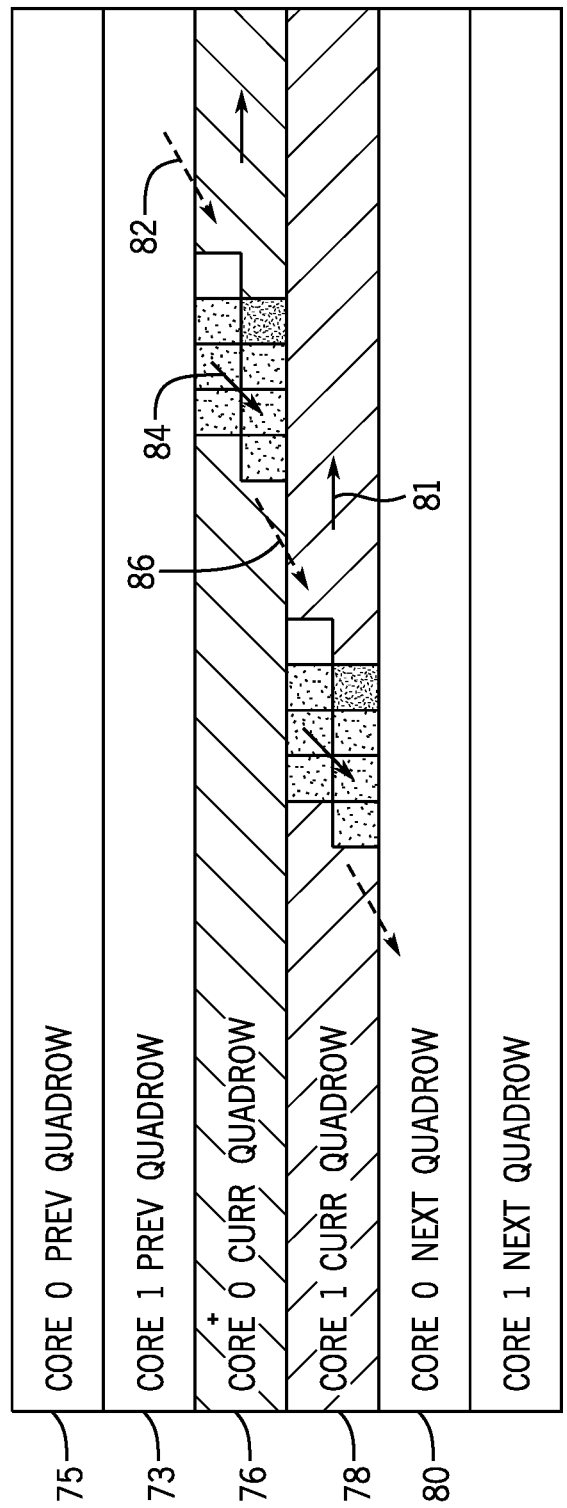
FIG. 8 is a first diagram of two processing cores parallel image frame encoding, in accordance with an embodiment.

With the foregoing in mind, FIG. 8 is a schematic diagram of two processing cores encoding of quad-rows, in accordance with the present embodiment. As discussed above, each processing core may function to encode quad-rows of image data by using neighbor data that has been encoded for the previous quad-row.

For example, solid arrows 81 may correspond to the direction of CTU unit processing in one dimension by each respective processing core inside a quad-row. The processing of each quad-row may be completed by a single processing core from left to right across the image frame. Each processing core may process multiple 32×32 blocks of pixels (e.g., CTU) that make up the quad-row. The CTU in the quad-row may be processed in a top down style order (e.g., bishop order) in a diagonal orientation. As the quad-row is being processed by the processing core, neighbor data may be propagated between the CTU rows. The neighbor data propagation within the quad-row may be represented by solid arrow 84 for each respective processing core encoding a respective quad-row.

When two processing cores are functioning to encode an image frame in parallel, neighbor data may be transferred from one processing core to the next processing core as demonstrated by dashed arrow 86. Each quad-row may be processed by the either of the two processing cores in a lockstep fashion until the entire image frame is processed. In between each quad-row neighbor data may be transferred between the two processing cores. For example, for the current quad-row of processing core 1 78 data may be stored in memory as the quad-row is encoded and once a suitable amount of data has been processed to begin processing of the next quad-row the data may be transferred to processing core 0 for processing of the next quad-row 80. Dashed arrows 82 demonstrate the passage of neighbor data by the processing core 0 70 to the next processing core 1 72 corresponding to the next quad-row.

For example, processing core 0 70 may be processing a CTU inside of a current quad-row 76 and may pass sufficient neighbor data to processing core 1 72 to enable processing core 1 72 to begin processing a current quad-row 78 (e.g., additional quad-row) through the transferring of neighbor data to the processing core 1 72. This may reduce the amount of storage used for the neighbor data (e.g., neighbor data for an entire quad-row) that may be stored in a buffer memory in a single processing core embodiment. Additionally, this may enable processing core 1 72 to begin encoding a next quad-row while processing core 0 70 is still processing a part of the previous quad-row. For example, the processing core 1 previous quad-row 73 may have transferred data needed for the encoding of the processing core 0 current quad-row 76. Additionally, the processing core 1 previous quad-row 73 may have received encoded data from the quad-row processing core 0 previous quad-row 75.

The ability to use more than one processing core reduces storage of data for the entire length of the frame, and enables just a portion of CTUs to be stored in memory by passing neighbor data directly from processing core 0 70 to processing core 1 72, rather than storing the entire quad-row data in a memory buffer. This may also reduce the buffer size used to store neighbor data, which may reduce latency if a buffer is used as part of the dedicated interface between the two processing cores. The two processing cores facilitate the transfer of data without having to transfer a large amount of a data to memory in between coding of quad-rows during video stream encoding.

Figure 9:
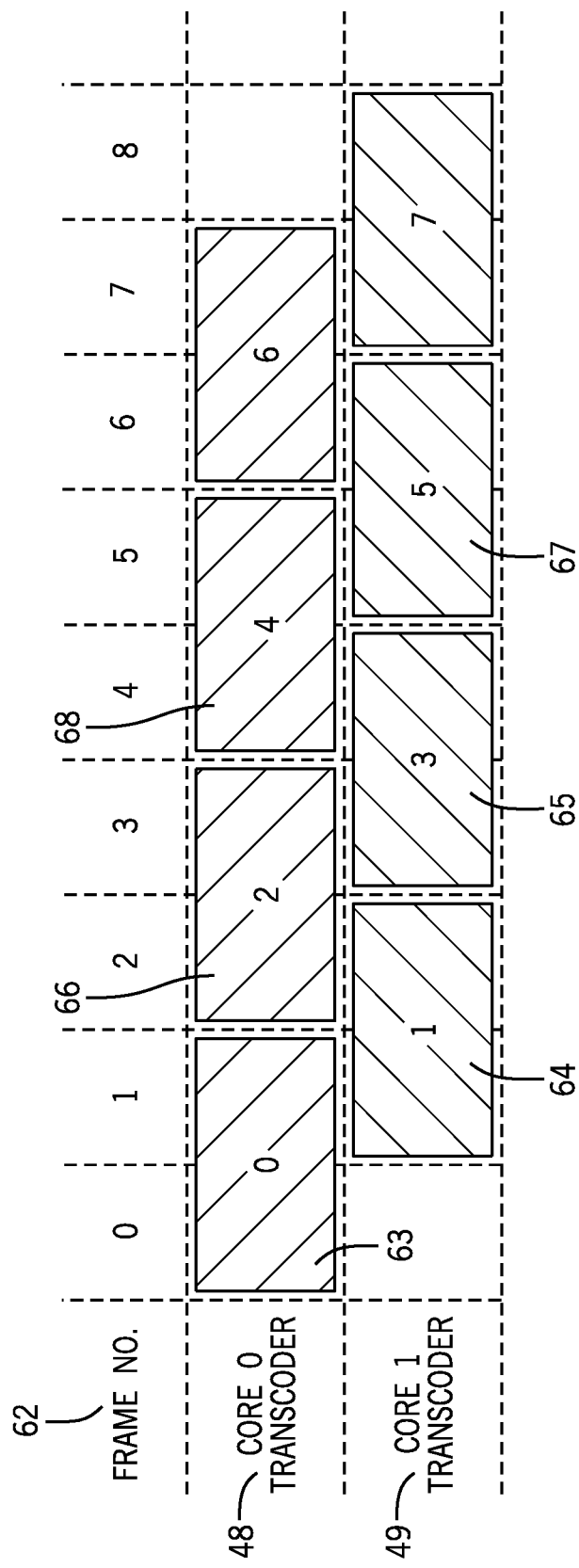
FIG. 9 is a diagram of two processing cores parallel image frame encoding using transcoders of the two processing cores, in accordance with an embodiment.

With the foregoing in mind, FIG. 9 is a diagram of video stream encoding using two processing cores with AVC transcoder operations. As described above, two processing cores may encode image frames in lockstep to enable more efficient encoding of image frames, and reduce amount of memory involved in video stream encoding. In some embodiments, each image frame may be processed by a transcoder corresponding to a single processing core in AVC operations. As discussed above, the controller 53 of the video encoder 40 may control operation of the communication between the processing core 0 70 and processing core 1 72. The controller processor 55 of the controller 53 may execute instructions stored in the controller memory 57, the instructions may relate to the transfer of data from CPU of the processing core 0 70 and the CPU of the processing core 1 72. The controller processor 55 may execute software and/or firmware that may provide routing instructions to the processing core 0 70 and the processing core 1 72 and/or direct the data to be routed from the processing core 0 70 to the processing core 1 72 by controlling the routing path between the processing cores, detailing how to route the data between the processing cores, and encoding order corresponding to the routed image data.

Additionally, the controller 53 of the video encoder 40 may send instructions to the processing cores 70, 72 to direct encoding of video data using the data routed between the processing cores 70, 72. The controller 53 may send instructions to either processing core to direct the video encoder hardware 40 to utilize the neighbor data passed between the cores during the encoding of the video data.

Additionally, the controller 53 of the video encoder 40 may send instructions to the processing cores 70, 72 to direct encoding of video data using the data routed between the processing cores 70, 72. The controller 53 may send instructions to either processing core to direct the video encoder hardware 40 to utilize the neighbor data passed between the cores during the encoding of the video data.

The encoder hardware may include a processing core 0 70 and a processing core 1 72 as discussed above. Processing core 0 70 may start processing quad-rows of a frame 1 64 of multiple image frames 62. Once processing core 0 70 has process a suitable amount of data for the quad-row the data may be passed to processing core 1 72. Processing core 1 72 may then use the processed data of processing core 0 70 to begin processing of a second quad-row of frame 1 64. This may enable the processing cores to function in a lockstep fashion to encode alternating quad-rows by transferring neighbor data of the previous encoded quad-row.

For example, processing core 0 70 may begin processing at a quad-row 0 and then move to processing at quad-row 2. Processing core 72 1 may start processing at quad-row 1 and then move to processing at quad-row 3. Processing core 1 72 may wait for a fixed number of CTUs worth of cycles until processing core 0 70 has produced necessary data to being processing at quad-row 1. The number of CTUs corresponding to the latency in the processing core 1 72 startup may be a very small percentage (e.g., 4K or 8K CTU row).

For a two processing cores configuration, quad-rows 0, 2, and 4 (63, 66, 68) may be encoded using the processing core 0 transcoder 48 and quad-rows 1, 3, and 5 (64, 65, 67) may be encoded using the processing core 1 transcoder 49. This will result in a single bitstream, as in a single processing core embodiment. The two processing cores may be interlocked to account for the encoding dependencies as mentioned above. The respective transcoders 48, 49 may function to process a single frame as demonstrated in FIG. 9. For example, frame 1 may be processed by processing core 0 70 and processing core 1 72, but may be transcoded using the transcoder of processing core 1 72 exclusively. Each frame may be processed by a single transcoder from a single processing core to mitigate multiple slice insertion and quantization parameter (QP) modulation due to multiple transcoders being used for a single image frame.

Figure 10:
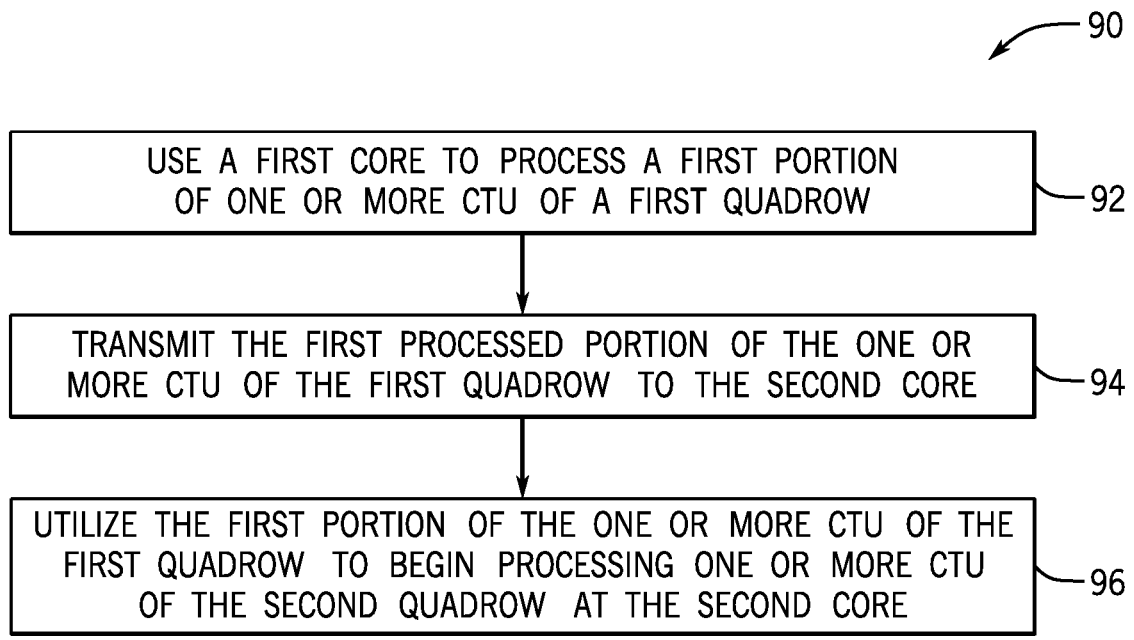
FIG. 10 is a flow diagram of multi-processing core image frame encoding, in accordance with an embodiment.

With the foregoing in mind, FIG. 10 is a flow diagram of a method 90 of two processing cores frame video stream encoding, in accordance with embodiments of the present disclosure. The two processing cores may transfer neighbor data corresponding to quad-rows between the two processing cores via communication of the DMA 44 and the CPU 41 of the processing cores. The method described above may be expanded to function with more processing cores than two. As discussed above, the controller 53 of the video encoder 40 may control operation of the communication between the processing core 0 70 and processing core 1 72. The controller processor 55 of the controller 53 may execute instructions stored in the controller memory 57, the instructions may relate to the transfer of data from CPU of the processing core 0 70 and the CPU of the processing core 1 72. The controller processor 55 may execute software and/or firmware that may provide routing instructions to the processing core 0 70 and the processing core 1 72 and/or direct the data to be routed from the processing core 0 70 to the processing core 1 72 by controlling the routing path between the processing cores, detailing how to route the data between the processing cores, and encoding order corresponding to the routed image data.

Additionally, the controller 53 of the video encoder 40 may send instructions to the processing cores 70, 72 to direct encoding of video data using the data routed between the processing cores 70, 72. The controller 53 may send instructions to either processing core to direct the video encoder hardware 40 to utilize the neighbor data passed between the cores during the encoding of the video data.

At process block 92, a processing core 0 70 may process a first portion of one or more CTU of a first quad-row. The processing core 0 70 may process the one or more CTU of the first quad-row from left to right along the image frame. The processing core 0 70 may be able to write the neighbor data for the CTU of the quad-row to a memory buffer and/or may transfer the data of the first portion of CTU directly to the processing core 1 72 via a wired dedicated interface. The neighbor data passed between the quad-rows to enable encoding of the next quad-row may include data at the bottom of a current encoded quad-row and may include pixel data, vector statistics, or other image data information involved in encoding of the next quad-row.

At process block 94, the processing core 0 70 is able to transmit the neighbor data from the first portion of one or more CTU of the first quad-row to the processing core 1 72. The processing core 1 72 may receive the neighbor data from the processing core 0 70 via reading the data from a memory buffer coupled to both the processing core 0 70 and the processing core 1 72 or directly from the processing core 0 70 via a wired connection. The processing core 0 70 may be connected to write channels of the processing core 1 72 or the processing core 1 72 may be connected to write channels of the processing core 0 70. The DMA channels 44 of each processing core may be used in a memory-to-memory (e.g., decoupled mode). The data may be transferred from the processing core 0 70 to the processing core 1 72 and/or the processing core 1 72 to the processing core 0 70.

At process block 96, the processing core 1 may use the neighbor data of the first portion of the one or more CTU of the first quad-row to begin processing one or more CTU of the next quad-row. The two processing cores may function to process the quad-rows of an image frame in this lockstep fashion for the entire frame of image data. It should be understood that the two processing cores or multiple processing cores may implement a variety of methods for multiple processing core encoding as described above.

Figure 11:
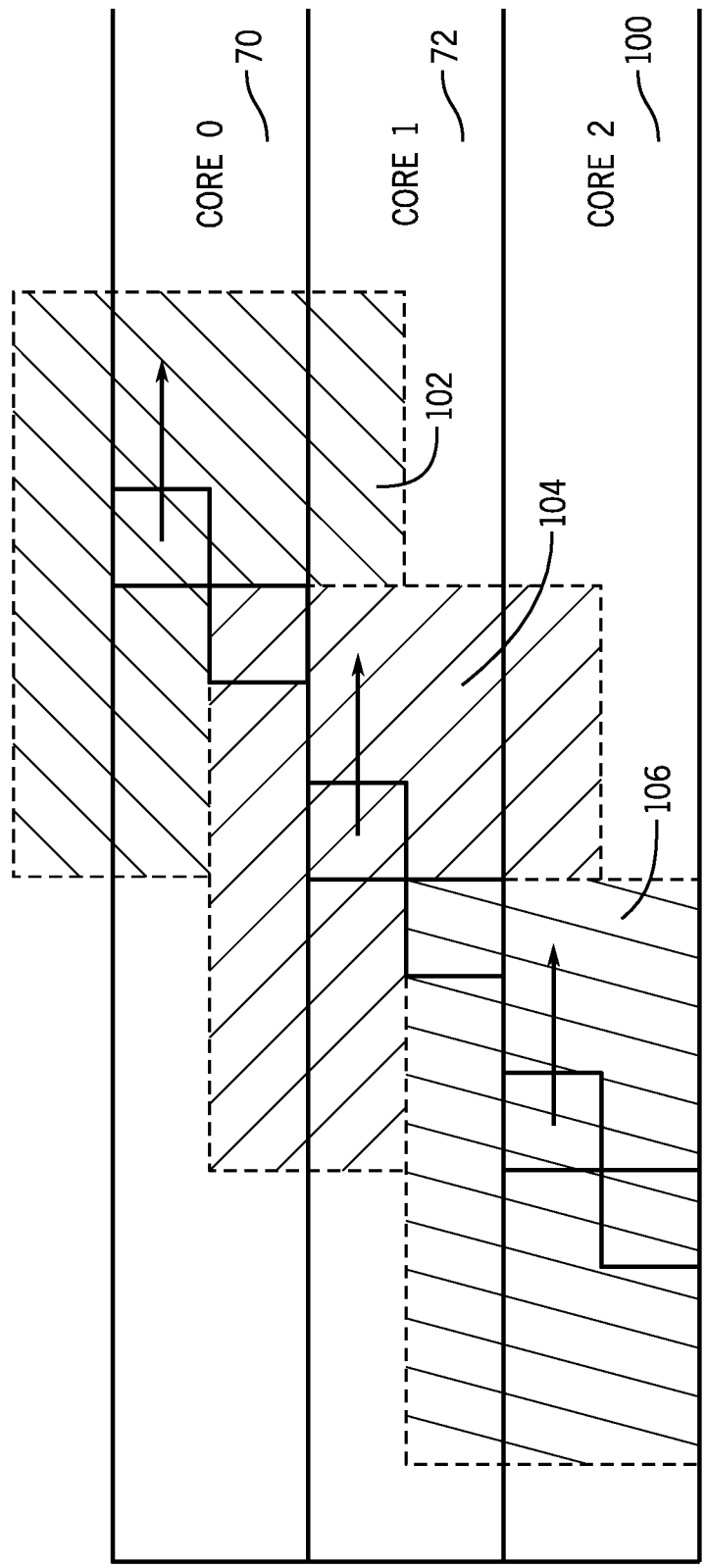
FIG. 11 is a diagram of multi-processing core parallel image frame encoding, in accordance with an embodiment.

Based on the foregoing, FIG. 11 is a diagram of multi-processing core parallel image frame encoding, in accordance with an embodiment. The encoder hardware may include one or more processing cores that may be used to encode the same image frame in parallel by processing the quad-rows of the image frame through communication between the processing cores. As discussed above, the controller 53 of the video encoder 40 may control operation of the communication between the processing core 0 70 and processing core 1 72. The controller processor 55 of the controller 53 may execute instructions stored in the controller memory 57, the instructions may relate to the transfer of data from CPU of the processing core 0 70 and the CPU of the processing core 1 72. The controller processor 55 may execute software and/or firmware that may provide routing instructions to the processing core 0 70 and the processing core 1 72 and/or direct the data to be routed from the processing core 0 70 to the processing core 1 72 by controlling the routing path between the processing cores, detailing how to route the data between the processing cores, and encoding order corresponding to the routed image data.

Additionally, the controller 53 of the video encoder 40 may send instructions to the processing cores 70, 72 to direct encoding of video data using the data routed between the processing cores 70, 72. The controller 53 may send instructions to either processing core to direct the video encoder hardware 40 to utilize the neighbor data passed between the cores during the encoding of the video data.

For example, processing core 0 70 may start processing a quad-row of image frame data 102 from left to right in a top-down diagonal order pattern of processing of the CTUs of the quad-row. A portion of the encoded quad-row data may be sent to processing core 1 72 via communication between processing core 0 70 and processing core 1 72 to enable processing core 1 72 to receive the neighbor data corresponding to the previous quad-row processing core 0 70 is processing. The processing core 1 72 may use the previous quad-row data image frame data 102 to process the next quad-row image frame data 104. Processing core 1 72 may process a portion of CTU of the next quad-row image frame data 104 and may transfer the data to a processing core 2 100 to begin processing the next quad-row image frame data 106.

The image encoder hardware may use any number of suitable processing cores to perform the parallel processing of image frame data by processing quad-rows of the image frame in a lockstep fashion as described above.

Figure 12:
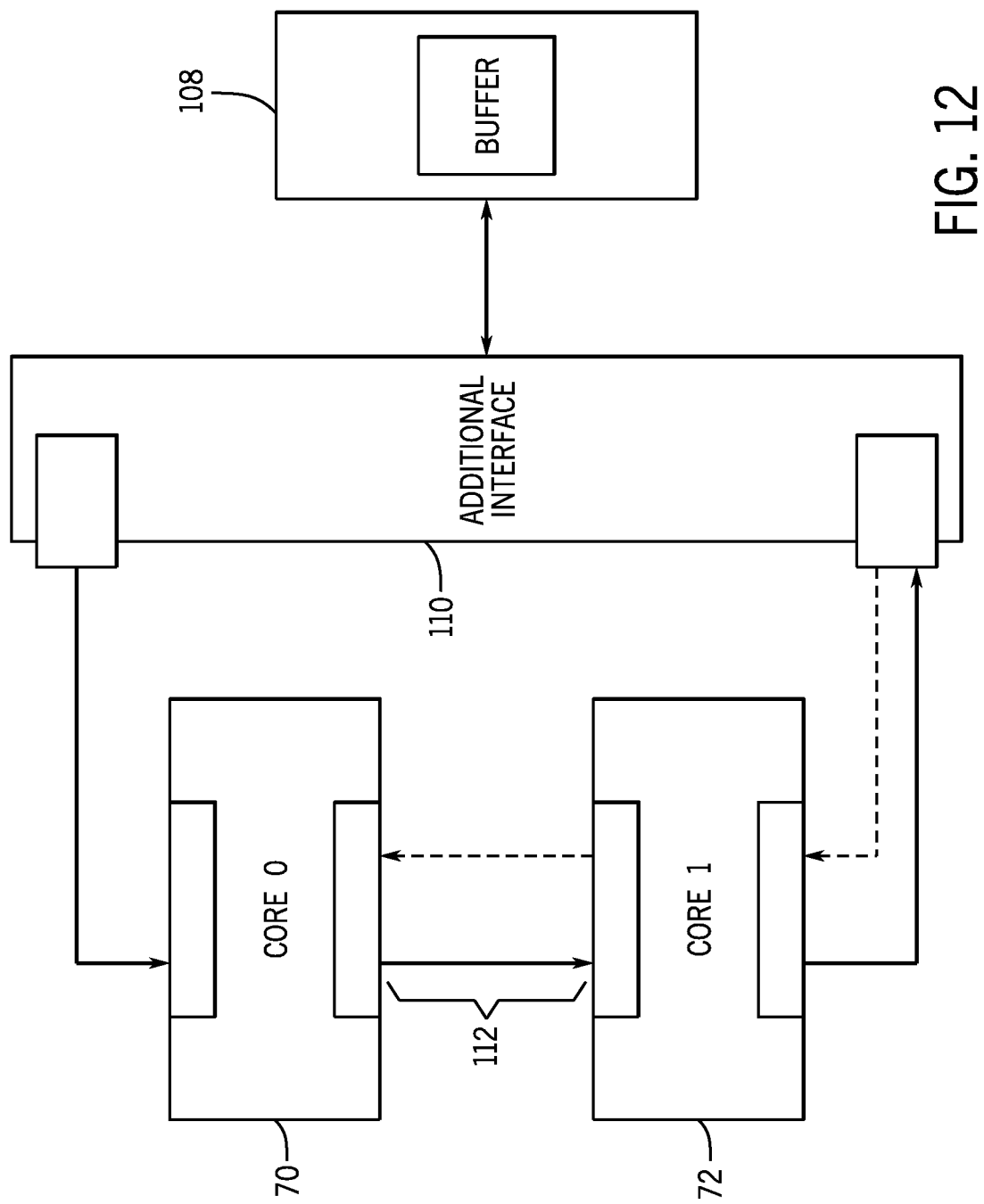
FIG. 12 is a diagram of two processing cores parallel image frame encoding using a dedicated interface, in accordance with an embodiment.

With the foregoing in mind, FIG. 12 represents transfer of neighbor data between multiple processing cores during processing of quad-rows of image frames directly through processing core communication at a dedicated interface (e.g., as shown in FIG. 7). The multiple processing cores of the encoder hardware may function to process multiple quad-rows of the image frame data by communicating quad-row neighbor data at a dedicated interface.

For example, processing core 0 70 may process a first portion of CTUs of a quad-row of image frame data. Processing core 0 70 may then send neighbor data of the quad-row directly to the processing core 1 72 via a dedicated interface 112. The processing core 1 72 may receive the neighbor data sent by the processing core 0 70 at the dedicated interface 112. The processing core 1 72 may then function to process a second portion of an additional quad-row based on the neighbor data transferred via the processing core 0 70 through the dedicated interface 112. The processing core 1 70 may then write the processed CTU neighbor data from the second quad-row to the DMA 44.

The processing core 0 70 may receive the neighbor data for the next quad-row by retrieving the data from the DMA 44 that was transferred by processing core 1 72. This enables two processing cores encoding of image frames without including additional memory buffers using a direct interface connection between the multiple processing cores. The processing core 0 70 and processing core 1 72 may each send data via an additional interface 110 that enables further data storage and retrieval. In addition, the additional interface 110 may transfer data to a memory buffer 108 component for further storage capabilities.

Figure 13:
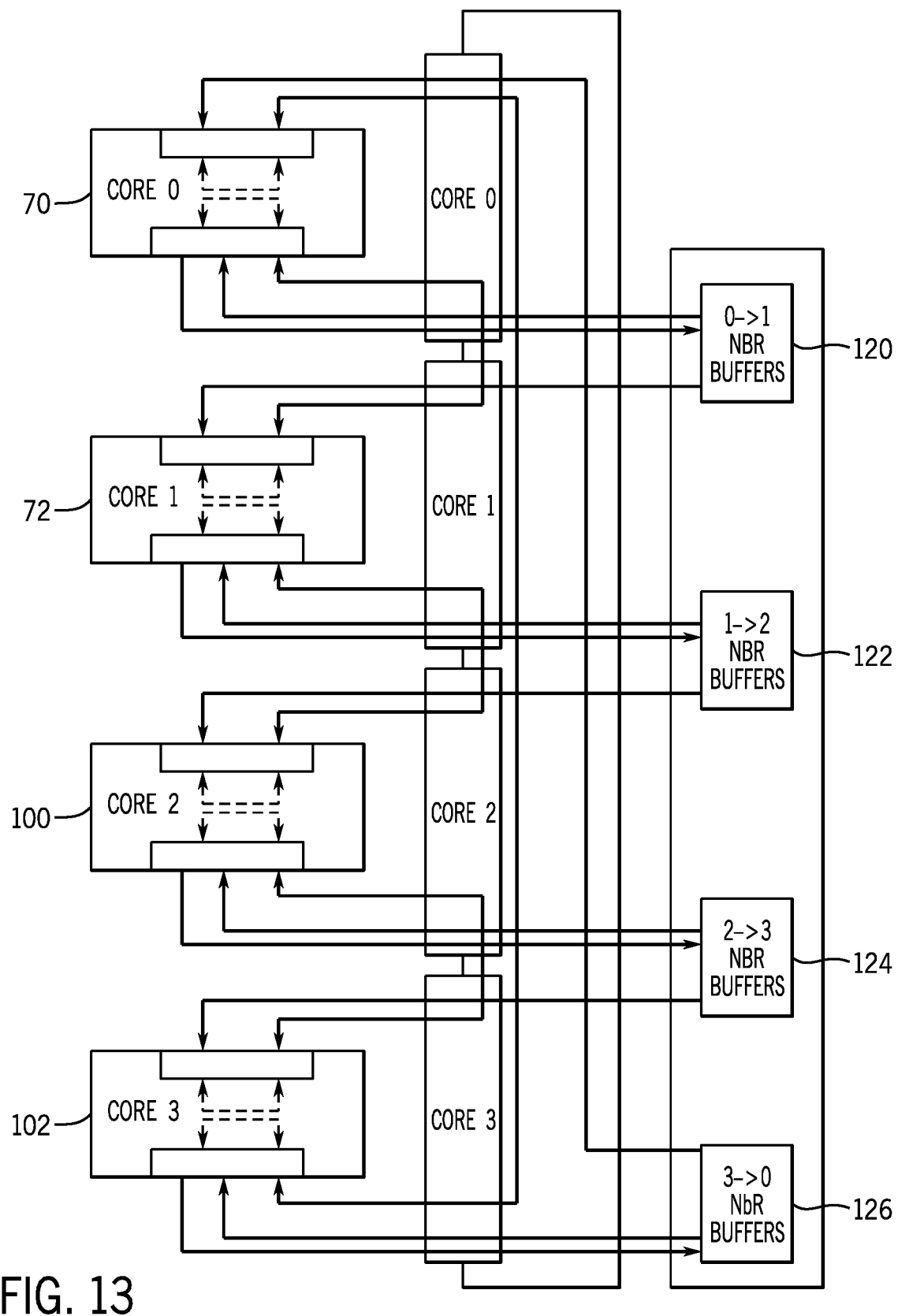
FIG. 13 is a diagram of multi-processing core parallel image frame encoding using memory buffers, in accordance with an embodiment.

Based on the foregoing, FIG. 13 represents transfer of neighbor data between multiple processing cores during processing of quad-rows of image frames using memory buffers. The multiple processing cores of the encoder hardware may function to process multiple quad-rows of the image frame data using one or more buffers.

For example, processing core 0 70 may process a first portion of CTUs of a quad-row of image frame data. Processing core 0 70 may then send neighbor data of the quad-row to a first memory buffer 120. The first buffer 120 (e.g., memory storage region) may be coupled to the processing core 1 72, so that the processing core 1 72 may retrieve the neighbor data by communicating with and retrieving the data from the first memory buffer 120 that is also coupled to the processing core 0 70. The processing core 1 72 may then function to process a second portion of an additional quad-row based on the neighbor data transferred via the processing core 0 70 through the first memory buffer 120. The processing core 1 70 may then write the processed CTU neighbor data from the second quad-row to the second memory buffer 122.

The processing core 2 100 may then establish communication with the second memory buffer 122 of processing core 1 72 and may read the neighbor data corresponding to the second portion of the additional quad-row. The processing core 2 100 may then use the neighbor data to begin processing a third portion of an additional quad-row. As described above, the processing core 2 100 may process the third portion of the additional quad-row and may transfer (e.g., write) the neighbor data corresponding to the third portion of the additional quad-row to the third memory buffer 124 corresponding to the processing core 2 100. A Processing core 3 102 may then communicate with the third memory buffer 124 of processing core 2 100 to retrieve the neighbor data and begin processing a fourth portion of an additional quad-row. The processing core 3 may write the neighbor data associated with the fourth portion of the additional quad-row to the fourth memory buffer 126 of the processing core 3 102 which may be accessed by processing core 0 70. Processing core 0 70 may then access the neighbor data of the processing core 3 102 and continue the process described above of processing the image frame data in a lockstep fashion using each of processing core 0 70, processing core 1 72, processing core 2 100, and processing core 3 102.

It should be understood that any suitable number of processing cores may be implemented in a similar fashion to increase the processing speed of image frame encoding. The processing cores may also include any corresponding number of memory buffers that are used to enable transfer of neighbor data between each processing core in the encoder hardware.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
video encoder circuitry that processes received video data, wherein the video encoder circuitry comprises:
a plurality of processing cores that process the received video data; and
a controller, wherein the controller is configured to:
direct a first processing core of the plurality of processing cores to process a first quad-row of the received video data and send first neighbor data associated with the first quad-row of the received video data directly to a second processing core of the plurality of processing cores via a wired connection connecting a first direct memory access of the first processing core of the plurality of processing cores to a second direct memory access of the second processing core of the plurality of processing cores while the first quad-row is being processed by the first processing core of the plurality of processing cores, wherein the second processing core of the plurality of processing cores is configured to process a second quad-row using the first neighbor data.

2. The electronic device of claim 1, wherein the controller is configured to:
direct the second processing core of the plurality of processing cores to send second neighbor data to the first processing core of the plurality of processing cores via the wired connection between the first processing core and the second processing core, wherein the first processing core of the plurality of processing cores is configured to process a third quad-row using the second neighbor data.

3. The electronic device of claim 1, wherein the controller is configured to:
direct the second processing core to send second neighbor data to a third processing core via the wired connection between the second processing core and the third processing core, wherein the third processing core is configured to process a third quad-row using the second neighbor data.

4. The electronic device of claim 1, wherein the first quad-row and the second quad-row are part of a same frame of image data.

5. The electronic device of claim 1, wherein the first processing core and the second processing core are connected via the wired connection, and wherein the first processing core is configured to send the first neighbor data directly to the second processing core via the wired connection.

6. An electronic device comprising encoder circuitry, wherein the encoder circuitry comprises:
a plurality of processing cores configured to encode image data; and
a controller, wherein the controller is configured to:
direct a first processing core of the plurality of processing cores to process a first quad-row of a first frame of image data using the first processing core of the plurality of processing cores, and send neighbor data directly to a second processing core of the plurality of processing cores via a wired connection connecting a first direct memory access of the first processing core of the plurality of processing cores to a second direct memory access of the second processing core of the plurality of processing cores while the first quad-row is being processed by the first processing core of the plurality of processing cores; and
direct the second processing core to process a second quad-row of the first frame, wherein the second processing core of the plurality of processing cores processes the second quad-row of the first frame using the neighbor data.

7. The electronic device of claim 6, wherein a single transcoder associated with one of the plurality of processing cores is configured to transcode all of the image data of the first frame after being processed by the first processing core and the second processing core.

8. The electronic device of claim 7, wherein the single transcoder is a transcoder of the second processing core of the plurality of processing cores.

9. The electronic device of claim 6, wherein the plurality of processing cores comprise respective encoder processing cores that contain a high efficiency video coding (HEVC) pipeline and an advanced video coding (AVC) pipeline.

10. The electronic device of claim 6, wherein the plurality of processing cores are configured to pass the neighbor data from a first coding tree unit (CTU) to a second CTU within the first quad-row.

11. The electronic device of claim 6, wherein the first processing core and the second processing core are connected via the wired connection, and wherein the first processing core is configured to send the neighbor data directly to the second processing core via the wired connection dedicated interface.

12. The electronic device of claim 6, wherein the plurality of processing cores are configured to encode a plurality image frames of the image data using one or more of: WPP, multiple tiles, or multiple slices.

13. The electronic device of claim 6, wherein the neighbor data comprises one or more of: motion vectors, deblocking parameters, and other parameters.

14. The electronic device of claim 6, wherein the plurality of processing cores respectively comprise a direct memory access (DMA), one or more encoder pipelines, one or more transcoders, and a central processing unit (CPU).

15. A tangible, non-transitory, machine-readable medium comprising instructions that, when executed by processing circuitry, causes the processing circuitry to perform operations comprising:
  processing a first quad-row of an image frame using a first processing core;
  sending neighbor data associated with the first quad-row directly to a second processing core via a wired connection connecting a first direct memory access of the first processing core to a second direct memory access of the second processing core while the first quad-row is being processed by the first processing core; and
  processing a second quad-row of the image frame using the second processing core using the neighbor data.

16. The tangible, non-transitory, machine-readable medium of claim 15, wherein the neighbor data comprises one or more of: motion vectors, deblocking parameters, and other parameters.

17. The tangible, non-transitory, machine-readable medium of claim 15, wherein the instructions, when executed, cause operations further comprising combining the processed image frame into an encoded bitstream of the image frame, wherein the encoded bitstream comprises luma and chroma color data.

18. The electronic device of claim 1, wherein the first neighbor data comprises pixel data, vector statistics, or both.

19. The electronic device of claim 1, wherein the controller is configured to direct the first processing core of the plurality of processing cores to send the first neighbor data to the second processing core of the plurality of processing cores based on a routing path, an encoding order, or both.

20. The electronic device of claim 1, wherein the controller is configured to write data associated with the processed second quad-row to the second direct memory access of the second processing core.

* * * * *